United States Patent [19]
Noble et al.

[11] 3,860,399
[45] Jan. 14, 1975

[54] LIQUID BLOCKING TECHNIQUE FOR WORKING A MEMBER TO PRECISE OPTICAL TOLERANCES

[75] Inventors: Milton L. Noble, Liverpool; Edmund H. Schindler, Newark, both of N.Y.

[73] Assignee: General Electric Company, Syracuse, N.Y.

[22] Filed: Dec. 7, 1972

[21] Appl. No.: 313,157

[52] U.S. Cl. ............... 51/283, 51/216 LP, 51/216 T
[51] Int. Cl. ............................ B24b 1/00, B24b 7/24
[58] Field of Search ........ 51/216 R, 216 LP, 216 T, 51/277, 283, 284; 269/20

[56] References Cited
UNITED STATES PATENTS

| | | | |
|---|---|---|---|
| 2,301,035 | 11/1942 | Golderer | 51/277 |
| 2,618,108 | 11/1952 | Richardson | 51/216 R |
| 2,699,633 | 1/1955 | Lapenas et al. | 51/216 R |
| 3,027,804 | 4/1962 | Wesley et al. | 51/216 LP X |
| 3,140,568 | 7/1964 | Beasley | 51/216 LP |
| 3,449,870 | 6/1969 | Jensen | 51/216 LP |

FOREIGN PATENTS OR APPLICATIONS
1,203,410    7/1959    France ........................... 51/216 LP OTHER PUBLICATIONS
IBM Technical Disclosure Bulletin, Mendel Volume 13, No. 4, Sept. 1970, Pg. 952.

*Primary Examiner*—Al Lawrence Smith
*Assistant Examiner*—K. J. Ramsey
*Attorney, Agent, or Firm*—Richard V. Lang; Frank L. Neuhauser; Carl W. Baker

[57] ABSTRACT

A liquid blocking technique is described providing a stress free support for a work piece that is being formed in an optical polishing machine. The technique is particularly useful as a final stage in forming optical surfaces when the accuracy sought must meet the exacting requirements of coherent optics. One particularly useful application of the invention is in making thin glass windows whose opposing surfaces must be accurately flat and parallel.

9 Claims, 3 Drawing Figures

PATENTED JAN 14 1975 3,860,399

LIQUID BLOCKING TECHNIQUE FOR WORKING A MEMBER TO PRECISE OPTICAL TOLERANCES

BACKGROUND OF THE INVENTION

1. Field of the Invention

The invention relates to methods of forming work pieces such as optical elements, mirrors and lenses to optical tolerances suitable for coherent optics. The invention relates more particularly to a technique for supporting the work piece during the formation process in such a manner as to preclude deformation of the work piece by stresses due to the support. In making an optical flat, the supporting technique favors convergence to a uniform thickness.

2. Description of the Prior Art

In normal glass polishing practice, the work is supported on a massive substrate with a thermal setting blocking pitch. Blocking pitches come in a variety of hardness and melting temperature combinations. Unfortunately, none of these blocking pitches hold the work in a stress free manner. Thus, even when an accurate surface is obtained on the work piece being blocked, and that surface is blocked against another accurate supporting surface, stresses are created in the blocking pitch during its hardening. To counteract these stresses, the work piece is normally moderately thick and the supporting optical flats or substrates are made of a very rigid construction. Typically, the diameter to thickness ratio is 4 to 1. This stiffness permits one to work the surfaces of the work piece to a tenth of a fringe or better, if there are no other problems.

Normally, when a thin, compliant work piece is being worked, fractional wavelength accuracy is precluded by the blocking stresses. Consequently, with a thin work piece, one takes a number of steps to reduce the blocking strains to a minimum. One normally selects the lowest melting temperature pitch available, so as to reduce the temperature differential and consequent thermal stresses between the substrate and work piece as the blocking pitch freezes.

The conventional pitch blocking process is slow, costly, and inefficient in high accuracy applications. The blocking and reblocking must be done with a minimum thermal stress to avoid fracture, and this requires time because of the substantial heat inertia in the thick substrate. At the end of the process, conventional blocking entails a substantial risk of scratching the finished work surface as it is slid off its support. Finally, conventional blocking prevents one from truly observing the accuracy of the finished surface while work progresses, since the blocking distortion may be greater than the accuracy being sought. For example, if the blocking distortion is on the order of 10 fringes, it is impractical to positively distinguish 10½ fringes from 11 fringes. In precluding evaluation of progress toward the desired accuracy, conventional blocking greatly complicates the procedure.

a measure which has been used to compensate for the errors due to blocking stresses, has been to observe the deformation that the stress may be expected to cause and to create a compensating curvature in the work piece. When this is done, it is normally possible to produce a surface on thick work pieces to within fractional fringes. The variation between the blocked and unblocked surface will depend upon the thickness or stiffness of the work. Thick plates only change a fringe or two off-block, but thin plates can change up to 10 fringes. This seriously degrades the effectiveness of working a compensating surface on the blocked work. If high accuracy is sought on thin work, such as fractional wavelength accuracy, this compensation method is simply not accurate enough. The difficulty lies in accurately observing the circularity and fringe count of some 8 – 10 fringes and then compensating to within a fraction of a fringe.

Finally, few of the methods presently known appear to favor an intrinsic convergence to a highly accurate parallel condition suitable for coherent applications. In most such cases, convergence at these accuracies is largely a matter of random occurence of skillful hand working upon the part of the optical technican.

SUMMARY OF THE INVENTION:

It is a principal object the present invention to provide an improved method of finishing a work piece to precise optical tolerances.

It is another object of the present invention to provide a stress free support for working a thin compliant work piece to precise optical tolerances.

It is still another object of the invention to provide an improved method of working a relatively thin work piece to precise parallelism.

These and other objects of the invention are provided in a novel method for working a thin work piece to a precise optical tolerance. In accordance with this method, a rigid substrate is provided having surface configuration of desired accuracy and the work piece has a first surface approximating the desired surface configuration to a first order of accuracy. The work piece is then supported upon the first surface of the substrate by liquid means providing a thin capillary film which provides a low stress, floating, compliant support to the work piece, the film causing the work piece and the support to adhere to one another and resiliently to oppose compressive forces inducing relative motion perpendicular to their surfaces. The support means are further provided with solid means engaging the work piece for restricting relative motion along the ajoining surfaces. The second surface of the work piece is then worked to a higher, second order of accuracy. Thereupon the work piece is removed, inverted, reblocked in the liquid supporting means, and the first surface of the work piece is finished to a higher, second order of accuracy. The liquid blocking step may then be iterated until both surfaces are flat to the desired final accuracy. During liquid blocking, the support means comprises a large substrate preferably of 0 temperature coefficient glass placed upon a pad on the blocking shell of the polishing apparatus, with an elastic band binding the blank to the substrate. Thus, both blank and substrate are supported stress free. For efficiency, the liquid blocking normally follows preliminary coarse grinding and initial polishing of both surfaces of the work piece. In working optical flats, the process is particularly desirable since the process converges naturally to a closely parallel condition.

BRIEF DESCRIPTION OF THE DRAWING:

The novel and distinctive features of the invention are set forth in the claims appended to the present application. The invention itself, however, together with the further objects and advantages thereof may best be understood by reference to the following description and accompanying drawings in which:

Figure 1:
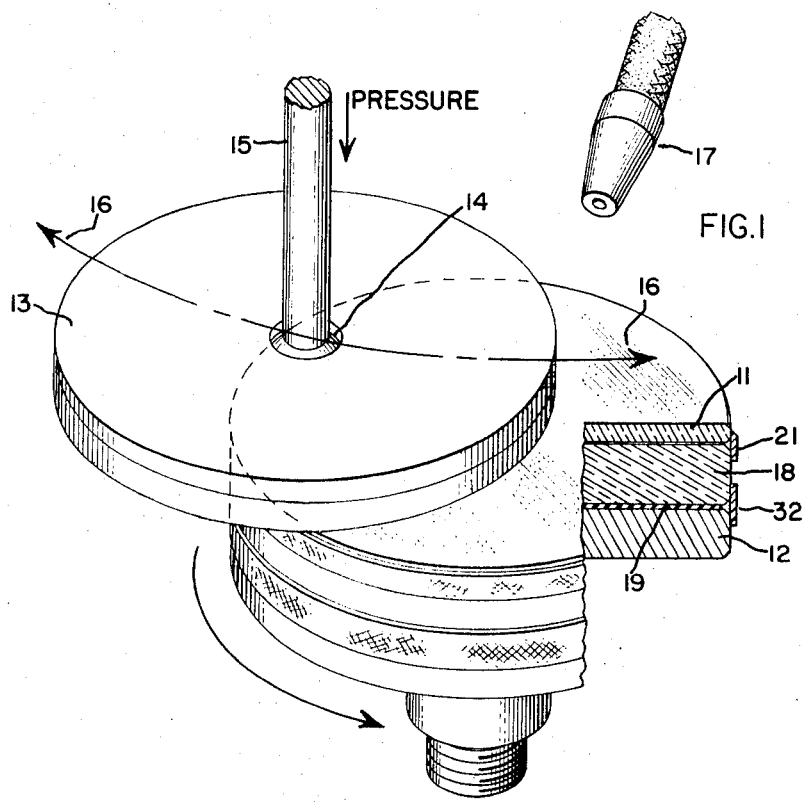
FIG. 1 is an illustration of a portion of the lens polishing apparatus used in performing Applicant's novel method of high accuracy surface polishing.

DESCRIPTION OF THE PREFERRED EMBODIMENT:

The inventive method will now be described in the preparation of a thin, flat, accurately parallel, optical blank 11. FIG. 1, while more particularly applicable to the liquid blocking stage of the procedure, may be referred to for illustration of the disposition of the working parts of the grinder and polisher in relation to the blank. The finished blank may be quite thin, a typical example being 36 to 1 in the ratio of diameter to thickness. The optical tolerance over the surface of the finished blank may be a fraction of a wavelength and suitable for use in coherent optical applications. The opposing surfaces of the blank may be made mutually parallel to less than an arc second. the method is applicable to blanks over a range of diameters, a typical size being 4½ inches.

In making a thin, optically flat blank of this nature, the method is divided into three successive stages: rough grinding using conventional techniques, initial polishing using conventional techniques; and a final polishing using the inventive liquid blocking technique.

To begin, a stress-free optical glass blank 11 is obtained having a thickness somewhat greater than the final dimensions desired. The excess may normally be about 50 thousandths of an inch. Using conventional optical grinding techniques, both surfaces of the blank are brought down to a thickness that is a few thousandths over the value ultimately sought and to close parallelism between the front and back surfaces. Conventional grit, pressures and rotational speeds are employed.

After the grinding process, the blank is removed from the grinding apparatus and installed in a conventional polishing apparatus whose essential operative parts are as illustrated in FIG. 1. The blank 11 is initially supported upon a thick optical flat 18. The latter is supported upon the cast iron base 12 of a conventional blocking shell, itself installed on the driving spindle of the polishing apparatus. In normal practice the "blocker" 18 is some 12 inches or more in diameter and a number of blanks are handled at one time. For the initial polishing, the blanks are attached to flat 18 in the conventional manner using blocking pitch. Thereupon, the initial polishing is undertaken with a free rotating polishing disc 13 mounted by means of a universal bearing 14 upon the shaft 15. The shaft 15 is driven in an oscillating path as indicated by the arrow 16 over the tops of the blanks. the polishing is conducted with a conventional polishing head, whose working surface is a layer of soft polishing pitch, of high accuracy, and usually scored at the beginning of the polishing process. The polishing compound is an aqueous suspension supplied from a nozzle 17 to the working surfaces. Conventional grits, speeds and polishing head pressures are employed. Progress is periodically checked with a master test flat until the upper surfaces of the blanks reach suitable precision. When the upper surfaces have been polished to the desired accuracy, the blanks are unblocked, inverted and the other surfaces are ground and polished to a corresponding surface accuracy and to the desired degree of parallelism.

Up to this point, the techniques of glass forming have been conventional. When each blank 11 is viewed with the test flat before unmounting from the blocker, the accuracy and parallelness of the surfaces may be quite high, normally being reduced to fractional fringes. Upon removing the blank from the support, however, the surface distorts. The distortion is most pronounced with thin, relatively compliant glass shapes. The distortion is usually attributed to the mounting process. While the pitch is liquid, surface tension pulls the blank into more perfect contact with the blocker. As the pitch freezes, created stresses are set between the glass blank and the supporting optical flat. Being thin and compliant, the blank deforms under these stresses.

As earlier noted, practiced lens polishers can anticipate the lens distortion — if small — and polish a compensating error into the surface of the blank. By this practice one may often reduce the distortions due to blocking stresses. However, the approach is only approximate, and is impractical when thin plates must be worked to fractional wave tolerances. The limitations in the compensation technique led to its present liquid blocking technique, which will now be described.

As illustrated in FIG. 1, the blank 11, which is now of a fairly high degree of optical accuracy, is placed with its best face down upon a large optical flat 18 of conventional "stiff" dimensions. The best face should be flat or concave, but not convex. The optical flat is chosen to have the same outer diameter as the blank 11. Assuming a diameter of 4½inches, an appropriate thickness for the flat is 1 inch. The stiffness of the flat should be such that it will retain its surface accuracy under the pressures which are exerted during the final polishing operation. The flat 18 is freely supported by stress free means upon the base plate 12 with a rubber pad at 19, and a second elastic band 32 binding the flat to the base plate. Since the pressures upon the polisher are reduced during this final polishing operation, the specified thickness of the flat provides adequate stiffness to maintain the surface accuracy to a fraction of a wavelength of light. After the blank 11 is placed on the flat 18, water is introduced at the periphery of the blank 11 and the flat 18 at their interfaces. The water will then be observed to occupy the space between them.

At this point, the water will be seen to provide a stress free support for the blank that is elastic in nature. If the blank is observed with a large-area, diffuse, monochromatic source both before and after addition of the water film, an examination of the surfaces of the blank will show that the water film does not create any significant surface distortion. While the blank cannot be lifted upward and away from the supporting disc, the attractive forces between the blank and the supporting disc are sufficiently even to prevent any appreciable distortion from occurring. If, on the other hand, one wishes to observe the resiliency of the water film support, one may apply a light finger pressure to the surface of the blank and observe the motion of the interference fringes between the blank and the supporting flat. The film will ordinarily remain elastic over a wide range of pressures. Narrowing of the cap is evidenced by variation in the interference fringes around the pressure point and they will contract or expand in response to the amount of pressure applied. The blank will appear to be suspended or to float upon this thin water film. The effect of localized pressure, therefore, will be cause the film to be compressed in the region of the pressure and local regions of the blank will "sink" into the film.

After the liquid film has been formed between the optical blank 11 and the supporting flat 18, a collar 21 is applied to prevent lateral surface displacement between them. The collar should not constrain motion perpendicular to their surfaces. The collar may take one of several forms. In FIG. 1, the simplest collar is shown. It consists of a winding of a band of compliant plastic tape around the perimeter of the blank and the flat. The winding is continued to the point where the resistance to translation is adequate to prevent any scuffing of the undersurfaces of the blank and the flat. Normally, this entails several layers of the tape. To prevent interference with the polishing operation, the upper edges of the band are trimmed so as not to extend over the upper surface of the blank. If the blank is viewed with monochromatic light, one may observe that the taping has not produced any further distortion of the blank.

As will be developed at greater length below, there are two alternate collar constructions which may be used to provide stress free support and which appear not to restrict the perpendicular component or floating action.

Once the blank is installed on the blocking shell, the liquid blocking polishing stage may begin. Initially, the polishing of the upper surface continues to the point where the upper surface approaches an improvement of a factor of from three to ten beyond its prior accuracy. Thereupon, the blank is removed from the optical flat, inverted and resupported by the water blocking method in the same manner as before. Thereupon, the polishing is reinstituted. The process may be iterated to the point where the errors are reduced to a fringe or a fraction thereof over the optical surfaces being polished. During water blocking, conventional pressures and speeds for master plate polishing are utilized.

An important feature of the water blocking method is the manner in which the thin blank converges to a parallel condition as one successively polishes each side. Normally, the work should be brought to a surface flatness of about three fringes or less and to a wedge angle of about 10 arc seconds before the water blocking stage is undertaken. When the blank has this initial accuracy, the water blocking will cause the wedge angle to converge to a very small error, normally less than an arc second. As previously noted, the flattest (and concave) side should be placed face down each time. Normally, the initial accuracy of three fringes is reduced to less than one fringe and finally to about one-tenth of a fringe in three iterations. The reason for this convergence is believed to lie in the fact that the work appears to "float" in an elastic film. When the polisher is working upon the surface of the blank it tends to remove the most glass from those areas which push hardest up against the polisher. Thus, the thicker surfaces, which cause the deepest impression in the water film, push back hardest upon the polishing head. Thus, the greatest rate of removal occurs where the blank is thickest, causing the surfaces to converge to a parallel condition.

Figure 2:
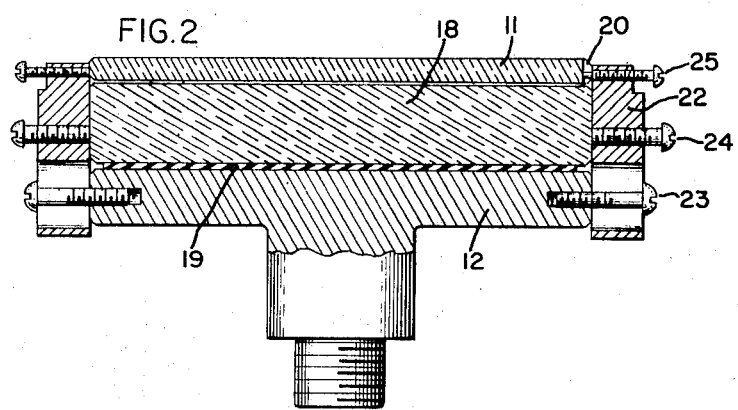
FIG. 2 is an illustration of the blocking shell and retaining ring used to support the work piece in the polishing apparatus for practice of the inventive method.
Figure 3:
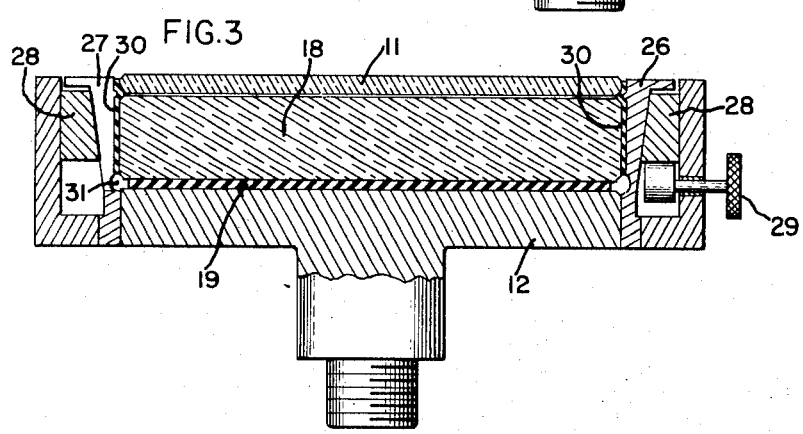
FIG. 3 is an illustration of an alternate construction of the work piece support, wherein the retaining ring is of collet type construction.

In FIGS. 2 and 3, two additional collar constructions are provided. In FIG. 2, the conventional blocking shell is provided at 12 and the optical flat 18 is supported upon a pad 19 lying upon that shell. As before, the blank 11 is supported upon the optical flat 18. A large collar 22 is supported by mounting screws 23 upon the base of the blocking shell. It retains the blank and the optical flat against lateral displacement. The collar 22 is provided with a first collection of nylon screws 24 for engaging the optical flat 18 and a second collection of set screws 25 for engaging the blank 11. In the blank, a vertical slot 20 engages with a cylindrical extension on one set screw (25) to prevent rotation. The surfaces of both the optical flat 18 and the upper blank 11 must be carefully examined during the screw tightening process, since any excessive pressure may distort the glass. With reasonable care, the point can be reached at which the members 11 and 18 are prevented from translational or rotational displacement without causing observable strain in the blank or the optical flat.

The arrangement in FIG. 3 is a more convenient design and employs an expandable collar which resembles the chucking collet for a lathe for engaging the blank and the supporting optical flat. The blank 11 is placed upon the optical flat 18 prior to assembly into the collet. After the two are superimposed, the water film is formed between their surfaces and a resilient band 30 is stretched around the perimeter of the blank 11 and the optical flat 18. At this point, the collet 26 is adjusted to its expanded condition and the blank and flat are slid down inside, coming to rest upon a rubber pad 19 placed on the upper surface of the base of the blocking shell.

As illustrated in the drawing, the collet comprises an upper flanged member 26 having a plurality of slots, one of which 27 is depicted at the left side in FIG. 3. It is also provided with a reduced section at 31 for additional adjustment flexibility. The slots permit a range of adjustment in the inner diameter of the collet under the infuence of a camming ring 28. The camming ring has a tapered inner diameter, tapering at about the same rate as the outer surface of the slotted flange 26. the camming ring 28 is set at its lowest position when the collet is being loaded. A succession of knurled, finger operated cams 29 are provided around the perimeter of the camming ring 28. when these cams are rotated in a direction to elevate the camming ring 28, the upper portion of the collet 26 is forced into compression about the perimeter of the optical flat 18 and the blank 11. The collet may then be adjusted to provide uniform and accurate support around the perimeter of the blank 11. The construction introduces no objectionable strains in the blank 11 or the underlying optical flat 18 if reasonable care is used in adjusting the cams.

The water blocking method which has just been described, appears to produce a transfer of the surface accuracy from the underyling optical flat to the upper surface of the thin blank which is being polished. Thus, the surface accuracy of the optical flat appears to set the ultimate accuracy that one can achieve in polishing the blank. It is essential, therefore, that the optical flat be of adequately high initial accuracy and be supported upon the blocking spindle without significant distortion from the supporting mechanisms or from the pressures exerted during the polishing process. Due to temperature problems, an optical flat using zero temperature coefficient glass is particularly desirable. A suitable material is Cervit (Owens-Illinois) which is non-porous.

Each of the collar constructions which have been described are designed to provide minimum interference with any motion between the blank and the supporting optical flat in a direction perpendicular to their adjoining surfaces. Since the film of the supporting water is very thin, the actual distance of travel between a stressed and an unstressed condition of the film is very small and can be measured in tens of wavelengths of light (at least several microns). Nevertheless, if an unduly rigid connection is made at the perimeter of the blank, some interference with the natural elasticity of support provided by the liquid film will occur. Thus, in the FIG. 2 embodiment, interference is prevented by tightening the set screws 25 to the point where motion will not occur but not sufficiently tight to introduce actual compression.

With respect to the FIG. 1 and FIG. 3 embodiments, the compliance of the edge supports is of an elastic nature. The edges of the blank and of the master flat are normally ground with bevelled edges. when an elastic tape (or an elastic band) is used to encircle the perimeters of the blank and flat, this tape pulls into the groove and provides a small, but uniform attractive force. Since the range of vertical motion is very small when the blank is supported by the water film, it appears that no objectionable stiffness is exerted by the tape to vertical motion. It is supposed that this is because the basic compliance of the tape is small in comparison to the other compliances.

The water blocking technique for polishing a thin optical blank to a highly parallel, highly precise surface has a particular advantage in that the accuracy of the surfaces may be readily checked as the process proceeds. The readings will be correct while the blank is in the block since the optical blank is always stress free and therefor undistorted. In addition, since a thermal setting blocking adhesive is unnecessary, there is no need to wait for the large heat capacity optical flat to adjust to temperature changes. One may directly remove the blank, insert it and immediately reinstall it on the optical flat.

The inventive process has been described in the formation of thin planar, optical flats having a high degree of parallelism. The floating action herein described which provides a resilient support to the work piece appears to provide a self-corrective action in bringing the two opposing surfaces into precise parallelism. The floating, compliant support of the work piece appears to provide an advantageous support in the formation of many thin elements, whether the surfaces being formed are flats, concave or convex. When spherical surfaces are involved, it is desirable that the supporting substrate accurately reproduce the undersurface of the work piece, allowing the surface error, if any, to provide minimum film thickness at the perimeter of the work piece to prevent rocking.

The invention may be practiced with a variety of liquid films, water being most convenient since it is normally used in the polishing apparatus. However, under normal conditions, the perimeter of the work piece and the supporting substrate are sealed from external contact, permitting one to make a selection independent of the polishing fluid. If faster working rates are sought, a more viscous liquid is dictated. Since the liquid film is very thin, and spreads evently through the gap between the blank and the substrate, the liquid appears to wet both surfaces. The observed spreading action is thus aided by "capillary" attraction. Since voids are not desirable and since the liquid film is preferably continuous throughout the gap, a liquid which wets the adjoining surfaces of the blank and substrate appears to be desirable.

What is claimed as new and desired to be secured by Letters Patent of the United States is:

1. The method of working a thin work piece to precise optical tolerances employing a polishing apparatus, comprising the steps of:
   a. preparing a rigid non-porous substrate having a surface configuration of desired accuracy;
   b. finishing the first surface of said work piece to said desired surface configuration to a first order of accuracy;
   c. supporting the workpiece by said first surface upon said substrate by a liquid means confined between said first surface and the surface of said substrate providing a thin capillary film of at least several microns in thickness which provides a low stress, compliant support to said work piece, said film causing the work piece and the support to adhere to one another and to resiliently oppose compressive forces inducing relative motion perpendicular to their adjoining surface, said support means further including solid means engaging said work piece for restricting relative motion along said adjoining surfaces; and
   d. working the second and opposite surface of said work piece to a higher, second order of accuracy.

2. The method set forth in claim 1 wherein:
   a. said working is carried on at a pressure within the resilient range of said capillary film, and wherein
   b. said substrate is supported upon said polishing apparatus in a stress free manner.

3. The method set forth in claim 2 wherein both surfaces of said work piece are finished to their desired surface configuration to a first order of accuracy prior to supporting said work piece by said liquid means.

4. The method set forth in claim 3 wherein:
   a. both surfaces have the same surface configuration, and wherein
   b. after working said second surface of said work piece to a second order of accuracy, said work piece is inverted in said support and said first surface is finished to at least a comparable order of accuracy.

5. The method set forth in claim 4 wherein said first and second surfaces are reworked iteratively to successively improve the surfaces to the desired order of accuracy.

6. The method set forth in claim 5 wherein both said surfaces are mutually parallel optical flats.

7. The method set forth in claim 1 wherein said solid support means comprises a resilient band encircling the work piece and said rigid support.

8. The method set forth in claim 1 wherein said support is an optical flat of zero temperature coefficient material.

9. The method set forth in claim 1 wherein said liquid is water.

* * * * *